United States Patent [19]

Inoue et al.

[11] Patent Number: 5,736,241
[45] Date of Patent: Apr. 7, 1998

[54] LAMINATE

[75] Inventors: Hiroshi Inoue; Toru Doi, both of Yokkaichi, Japan

[73] Assignee: Tosoh Corporation, Yamaguchi-ken, Japan

[21] Appl. No.: 611,573

[22] Filed: Mar. 6, 1996

[30] Foreign Application Priority Data

Mar. 8, 1995 [JP] Japan ................................. 7-048242

[51] Int. Cl.⁶ ................................................ B32B 3/26
[52] U.S. Cl. ........................ 428/332; 428/473.5; 428/412
[58] Field of Search ........................... 428/412, 473.5, 428/332

[56] References Cited

U.S. PATENT DOCUMENTS

| | | | |
|---|---|---|---|
| 5,422,189 | 6/1995 | Warner et al. | 428/480 |
| 5,591,530 | 1/1997 | Warner et al. | 428/480 |

*Primary Examiner*—E. Rollins Buffalow
*Attorney, Agent, or Firm*—Sughrue, Mion, Zinn, Macpeak & Seas, PLLC

[57] ABSTRACT

Disclosed is a laminate comprising N-alkyl-substituted maleimide-olefin type copolymer and aromatic polycarbonate, wherein the thickness of N-alkyl-substituted maleimide-olefin type copolymer layer x and the thickness of aromatic polycarbonate layer y in the laminate satisfy the following formula.

$$0.4 < x/(x+y) < 0.98$$

A laminate with excellent transparency, heat resistance, strength and rigidity that improves low impact resistance having been a drawback of N-alkyl-substituted maleimide-olefin type copolymers is provided.

5 Claims, No Drawings

LAMINATE

BACKGROUND OF THE INVENTION

The present invention relates to a laminate with excellent transparency, heat resistance, mechanical strength, rigidity and impact resistance, comprising an N-alkyl-substituted maleimide-olefin type copolymer and an aromatic polycarbonate.

The N-alkyl-substituted maleimide-olefin type copolymer is a material that is expected to find applications in the sector of photoelectronics, sector of automobiles and electric and electronic sectors as a transparent high-molecular material excellent in the transparency, heat resistance, mechanical strength, rigidity, weather resistance, surface hardness, etc.

So far, as a sheet material, glass has been used generally, but, in recent years, from the points of producibility, lightening in weight, safety, designing capability, etc., the transparent high-molecular materials have become to be used.

As such materials, poly(vinyl chloride) (hereinafter abbreviated PVC), poly(methyl methacrylate) (hereinafter abbreviated as PMMA), aromatic polycarbonate (hereinafter abbreviated as PC), etc., are used. PVC is a cheap material, but it has problems of low heat resistance, poor surface characteristics as a sheet, etc., hence it is being replaced with PMMA or PC. While PMMA is excellent in the optical characteristics, however, the heat resistance is insufficient, limiting the use. Also, while PC shows relatively high heat resistance, it has had problems of low surface hardness thus being easily scratched, poor moldability, poor weather resistance, poor solvent resistance leading to the occurrence of solvent cracks, and the like.

Moreover, since a maleimide type copolymer has high heat resistance, various copolymers has been investigated. For example, a method of copolymerizing methyl methacrylate with N-aromatic-substituted maleimide is disclosed in Japanese Patent Publication No. Sho 43-9753 and Japanese Unexamined Patent Publication Nos. Sho 61-141715, Sho 61-171708 and Sho 62-109811. Also, a method of copolymerizing styrenic resin with N-aromatic-substituted maleimide is disclosed in Japanese Unexamined Patent Publication Nos. Sho 47-6891, Sho 61-76512 and Sho 61-276807. With the resins obtainable by these methods, however, the more the content of N-aromatic-substituted maleimide, the better the heat resistance, but they have had problems of brittleness, poor processibility, coloring, etc., finding no use as sheets.

On the other hand, the N-alkyl-substituted maleimide-olefin type copolymer disclosed in Japanese Unexamined Patent Publication Nos. Hei 4-31407 and Hei 5-59193 is attracting an attention as a transparent high-molecular material that has overcome said drawbacks of conventional materials, but this material has insufficient impact resistance, which has been a restriction in the aspect of uses.

The invention has solved the low impact resistance being a drawback of N-alkyl-substituted maleimide-olefin type copolymers by laminating with PC, and provides a laminate excellent additionally in the strength and rigidity.

SUMMARY OF THE INVENTION

The invention relates to a laminate with excellent transparency, heat resistance, mechanical characteristics and impact resistance, the laminate comprising an N-alkyl-substituted maleimide-olefin type copolymer, with constitutional component (I) shown below being 30 to 98 mol % of the overall polymer and constitutional component (II) being 70 to 2 mol % of the overall polymer and with weight average molecular weight in terms of polystyrene being not less than $1\times10^3$ to not more than $5\times10^6$, and PC, wherein the thickness of N-alkyl-substituted maleimide-olefin type copolymer layer x and the thickness of PC layer y in said laminate satisfy following formula (III).

(wherein $R^1$ denotes an alkyl group with carbon atoms of 1 to 18 or cycloalkyl group with carbon atoms of 3 to 12),

(wherein $R^2$ is a hydrogen atom or alkyl group with carbon atoms of 1 to 8 and $R^3$, and $R^4$ and denote alkyl groups with carbon atoms of 1 to 8), $$0.4 < x/(x+y) < 0.98 \quad (III).$$

DETAILED DESCRIPTION OF THE INVENTION

The N-alkyl-substituted maleimide-olefin type copolymer to be used in the invention can be obtained, for example, through the radical copolymerization reaction between N-alkyl-substituted maleimides and olefins.

Compounds that give constitutional component (I) are N-alkyl-substituted maleimides such as N-methylmaleimide, N-ethylmaleimide, N-n-propylmaleimide, N-i-propylmaleimide, N-n-butylmaleimide, N-i-butylmaleimide, N-s-butylmaleimide, N-t-butylmaleimide, N-n-pentylmaleimide, N-n-hexylmaleimide, N-n-heptylmaleimide, N-n-octylmaleimide, N-laurylmaleimide, N-stearylmaleimide, N-cyclopropylmaleimide, N-cyclobutylmaleimide and N-cyclohexyl maleimide, and, thereamong, N-methylmaleimide, N-ethylmaleimide, N-i-propylmaleimide or N-cyclohexylmaleimide are preferable. Moreover, these can be used solely or by combining two or more kinds.

Compounds that give constitutional component (II) are olefins such as isobutene, 2-methyl-1-butene, 2-methyl-1-pentene, 2-methyl-1-hexene, 2-methyl-1-heptene, 1-isooctene, 2-methyl-1-octene, 2-ethyl-1-pentene, 2-methyl-2-butene, 2-methyl-2-pentene and 2-methyl-2-hexene, and, thereamong, isobutene is particularly preferable. Moreover, these can be used solely or by combining two or more kinds.

The content of constitutional component (I) is 30 to 98 mol % of the overall polymer and preferably is 40 to 75 mol % and particularly preferably is 50 to 70 mol %. If the constitutional component (i) exceeds 98 mol %, the polymer formed becomes brittle, and, if under 30 mol %, then the heat resistance of the polymer decreases, which is unpreferable.

Moreover, if need be, other vinyl type monomers can be copolymerized within a range not injuring the purpose of the invention. As other vinyl type monomers, one or more kinds of compounds selected from styrene, α-methylstyrene, vinyltoluene, 1,3-butadiene and isoprene and their halogensubstituted derivatives, methacrylic esters such as methyl methacrylate, ethyl methacrylate, cyclohexyl methacrylate, phenyl methacrylate and benzyl methacrylate, acrylic esters such as methyl acrylate, ethyl acrylate, butyl acrylate, cyclohexyl acrylate, phenyl acrylate and benzyl acrylate, vinyl esters such as vinyl acetate and vinyl benzoate, vinyl ethers such as methyl vinyl ether, ethyl vinyl ether, propyl vinyl ether and butyl vinyl ether, vinyl chloride, vinylidene chloride, maleic anhydride, N-phenylmaleimide, N-carboxyphenylmaleimide, acrylonitrile, ethylene, propylene, 1-butene, 2-butene and 1-hexene can be mentioned.

For the polymerization of these monomers, any of publicly known polymerization processes, for example, a bulk polymerization process, solution polymerization process, suspension polymerization process and emulsion polymerization process is adoptable.

As the polymerization initiators, organic peroxides such as benzoyl peroxide, lauroyl peroxide, octanoyl peroxide, acetyl peroxide, di-t-butyl peroxide, t-butylcumyl peroxide, dicumyl peroxide, t-butyl peroxyacetate and t-butyl peroxybenzoate, or azo type initiators such as 2,2'-azobis-(2,4-dimethylvaleronitrile), 2,2'-azobis-(2-butyronitrile), 2,2-azobisisobutyronitrile, dimethyl-2,2'-azobisisobutyrate and 1,1'-azobis-(cyclohexane-1-carbonitrile) are mentioned.

As the solvents usable for solution polymerization, benzene, toluene, xylene, ethylbenzene, cyclohexane, dioxane, tetrahydrofuran, acetone, methyl ethyl ketone, dimethylformamide, isopropyl alcohol, butyl alcohol, etc., and their mixtures are mentioned.

The polymerization temperature can be set appropriately depending on the decomposition temperature of the initiator, but it is generally preferable to conduct polymerization within a range from 40° to 150° C.

The amount of residual monomer in the polymer is not more than 3% by weight and preferably is not more than 1% by weight and particularly preferably is not more than 0.1% by weight. When the amount of residual monomer exceeds 3% by weight, the polymer often becomes colored.

The resin aforementioned can also be obtained by post-imidizing a resin obtained through the copolymerization between maleic anhydride and olefins using primary amines such as alkylamine, and the like.

Such post-imidation reaction can be conducted, for example, by dissolving or dispersing maleic anhydride-isobutene copolymer into an alcoholic solvent such as methanol, ethanol or propanol, amidic solvent such as N-methyl-2-pyrrolidone or dimethylformamide, aromatic hydrocarbon solvent such as benzene or toluene, aliphatic hydrocarbon solvent such as n-nonane, n-decane, n-undecane or n-dodecane, or the like, and reacting with a primary amine such as methylamine at a temperature of 100° to 350° C.

Here, the weight average molecular weight ($M_w$) of resin produced can be determined by means of gel permeation chromatography (GPC). The weight average molecular weight of the inventive resin is preferably to be not less than $1\times10^3$ to not more than $5\times10^6$, in particularly, not less than $1\times10^5$ to not more than $1\times10^6$. If the weight average molecular weight exceeds $5\times10^6$, the moldability becomes poor and, if under $1\times10^3$, then the resin obtained tends to become brittle.

On the other hand, PC to be used in the invention is a polymer containing a unit of

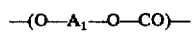

$$-(O-A_1-O-CO)- \qquad (IV)$$

(wherein $A_1$ is a bivalent aromatic residue derived from bivalent phenol used for the production of said polymer). These are produced generally by reacting a bivalent phenol compound with a carbonate precursor, for example, phosgene, halogen formnate or carbonate ester. For the bivalent phenols in the production of said PC, monocyclic aromatic compounds or polycyclic aromatic compounds with two hydroxyl groups each directly bonding to a carbon atom of an aromatic nucleus can be used.

Branched PC is already known by itself as described, for example, in the specification of U.S. Pat. No. 4,001,184 is also usable. PCs to be used in the invention also include those called polyester carbonates obtainable by conducting said polymerization reaction in the presence of ester precursors, for example, bifunctional carboxylic acids like terephthalic acid or their ester-forming derivatives. These polyester carbonates have both an ester bond and carbonate bond in their polymer chain. The polyester carbonates are described, for example, in the specification of U.S. Pat. No. 3,169,121 and mixtures of these various PCs are also usable.

Next, explanation will be made about the laminate of the invention. For obtaining the laminate with excellent strength, rigidity and impact resistance being features of the invention, the thickness of N-alkyl-substituted maleimide-olefin type copolymer x and the thickness of PC y in said laminate need to satisfy formula (III).

$$0.4 < x/(x+y) < 0.98 \qquad (III).$$

If the value of $x/(x+y)$ is not larger than 0.4, the impact strength improves, but the decrease in rigidity is significant, which is unpreferable. On the other hand, if the value of $x/(x+y)$ is not smaller than 0.98, then the decrease in rigidity is little, but the improvement effect on impact strength becomes not to be perceivable, which is unpreferable.

Moreover, with respect to the method of producing the inventive laminate, there is no restriction particularly because of good adhesion between the N-alkyl-substituted maleimide-olefin type copolymer and PC, hence production is possible using publicly known molding processes, i.e., extrusion moldings such as coextrusion and lamination, injection moldings such as two-color molding and film insertion, compression molding, and the like.

Besides, to the resin constituting the laminate of the invention, if need be, various dyes, inorganic and organic particles, thermal stabilizers such as hindered phenols, organic phosphates, ultraviolet stabilizers such as benzotriazole type and hindered amine type, antistatic agents, various lubricants, etc., may be added, and, further, within a range not deviating from the purpose of the invention, other resins and other elastomers can also be blended. Moreover, within a range not deviating from the purpose of the invention, other resins and other elastomers can be laminated additionally onto the laminate of the invention. Furthermore, the laminate obtained can be surface modified by providing it with a hard coat using a silicon-based, acrylic-based or melamine-based hard coating agent, by forming a transparent electroconductive film with ITO (INDIUM TIN OXIDE) or the like, or by forming a reflecting film, reflection-reducing film or the like. Also, various printings etc., are possible.

Since the laminate of the invention is not only excellent in the transparency, heat resistance, strength and rigidity, but also excellent in the impact resistance, it can be used for various signboards, signs, displays, illumination covers, panels for vending machines, display shelves at supermarkets, etc., building materials such as a carport, terrace, balcony, sunroof, lighting dome, room divider, door and window, name plate, OA instruments such as a CRT, electric and electronic parts, parts for an automobile, electric train and airplane such as a panel, sunroof, visor and window, and stationeries and sundries such as a template, ruler and desk mat.

In the following, the invention will be illustrated in detail based on the examples, but the invention is not confined to these examples alone.

Besides, the weight average molecular weight of the polymer produced was determined in terms of polystyrene using GPC (HLC-802A from Tosoh Corp.).

Synthetic example 1

Synthetic example of N-methylmaleimide-isobutene copolymer used in the examples and comparative examples is shown below.

Into a 50 L autoclave equipped with stirrer, nitrogen-introducing pipe, thermometer and degassing pipe were charged 2780 g (25 mol) of N-methylmaleimide, 4 g (0.025 mol) of 2,2'-azobisisobutyronitrile (AIBN) and 40 L of dioxane. After purging several times with nitrogen, 2805 g (50 mol) of isobutene were charged and the mixture was reacted for 12 hours at 60° C. After reaction, the content was poured into ethanol to deposit polymer. The polymer thus obtained was reprecipitated with dioxane-methanol for purification and then dried for 24 hours at 60° C. under reduced pressure. Yield was 4025 g.

From the result of elemental analysis of polymer obtained (C:64.7% by weight, H:7.8% by weight, N:8.4% by weight), the maleimide unit in the polymer produced was 50 mol %. Moreover, the weight average molecular weight ($M_w$) of polymer obtained was 163000.

EXAMPLE 1

N-methylmaleimide-isobutene copolymer obtained in Synthetic example 1 was extruded through a Labo Plastmill (from Toyo Seiki Co., Ltd.) to make a 1.5 mm thick film. On the other hand, PC (trade name Panlite from Teijin Kasei Co., Ltd.) was also extruded using the same equipment to make a 1.5 mm thick film. Each one sheet obtained was introduced into a metal mold for compression molding and compressed under the conditions of 260° C. and 300 kg/cm² to make a laminate. A test piece of 80×12×3 mm was cut off from the laminate obtained to measure the flexural strength and flexural modulus of elasticity according to ASTM D790. Moreover, a test piece of 30 mm φ and 3 mm thickness was cut off from the laminate obtained to measure the shock strength using a DuPont shock tester. Results are shown in Table 1. It can be seen that the laminate has not only high flexural resistance and flexural modulus of elasticity, but also excellent shock resistance.

EXAMPLES 2 AND 3

N-methylmaleimide-isobutene copolymer and PC were molded into sheets with predetermined thicknesses as described in Table 1 by the procedures similar to Example 1, and each one sheet obtained was compression molded by the procedure similar to Example 1 to make a laminate. Test pieces were cut off from the laminate obtained by the methods similar to Example 1 to measure the flexural strength, flexural modulus of elasticity and shock strength. Results are shown in Table 1.

Comparative example 1

A 3.0 mm thick sheet of N-methylmaleimide-isobutene copolymer was made by the procedure similar to Example 1, and test pieces were cut off from this sheet to measure the flexural strength, flexural modulus of elasticity and shock strength. Results are shown in Table 1. It is seen that, while the flexural strength and flexural modulus of elasticity are higher compared with the Examples, the shock strength is lower, showing poor shock resistance.

Comparative example 2

A 3.0 mm thick sheet of PC (trade name Panlite from Teijin Kasei Co., Ltd.) was made by the procedure similar to Example 1, and test pieces were cut off from this sheet to measure the flexural strength, flexural modulus of elasticity and shock strength. Results are shown in Table 1. It is seen that, while the shock strength is higher compared with the Examples, the flexural strength and flexural modulus of elasticity are lower.

Comparative example 3

N-methylmaleimide-isobutene copolymer and PC were molded into sheets with predetermined thicknesses as described in Table 1 by the procedures similar to Example 1, and each one sheet obtained was compression molded by the procedure similar to Example 1 to make a laminate. Test pieces were cut off from the laminate obtained by the methods similar to Example 1 to measure the flexural strength, flexural modulus of elasticity and shock strength. Results are shown in Table 1. It is seen that, if the value of x/(x+y) is out of the range of the invention, no laminate excellent in all of the flexural strength, flexural modulus of elasticity and shock strength can be obtained, even if both may be laminated.

TABLE 1

| | Laminate | | | Flexural | | |
|---|---|---|---|---|---|---|
| | Thickness of N-methyl-maleimide-isobutene copolymer layer x (mm) | Thickness of aromatic polycarbonate layer y (mm) | x/(x + y) | Flexural strength (kg/cm²) | modulus of elasticity (kg/cm²) | Impact strength (kg · cm) |
| Example 1 | 1.5 | 1.5 | 0.5 | 1250 | 35000 | 50 |
| Example 2 | 2.0 | 1.0 | 0.7 | 1260 | 38000 | 40 |
| Example 3 | 2.5 | 0.5 | 0.8 | 1280 | 40000 | 20 |
| Comparative example 1 | 3.0 | — | 1.0 | 1300 | 49000 | 10 |
| Comparative example 2 | — | 3.0 | 0 | 820 | 28000 | 280 |
| Comparative example 3 | 1.0 | 2.0 | 0.3 | 1170 | 32000 | 90 |

What is claimed is:

1. A laminate comprising an N-alkyl-substituted maleimide-olefin copolymer with component (I) shown below being 30 to 98 mol % of the copolymer and component (II) shown below being 70 to 2 mol % of the copolymer, wherein the weight average molecular weight in terms of polystyrene of the copolymer is not less than 1×10³ to not more than 5×10⁶ and an aromatic polycarbonate, wherein the thickness of N-alkyl-substituted maleimide-olefin copolymer layer x and the thickness of aromatic polycarbonate layer y in said laminate satisfy following formula (III)

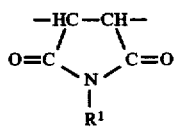
(I)

wherein R¹ denotes an alkyl group with 1 to 18 carbon atoms or a cycloalkyl group with 3 to 12 carbon atoms,

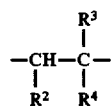
(II)

wherein R² is a hydrogen atom or an alkyl group with 1 to 8 carbon atoms, and R³ and R⁴ denote alkyl groups with 1 to 8 carbon atoms, $$0.4 < x/(x+y) < 0.98 \qquad (III),$$

wherein said laminate has a flexural modulus of elasticity of 35,000 kg/cm² or more.

2. The laminate of claim 1, wherein component (I) is 40 to 75 mol % of the copolymer and the weight average molecular is not less than 1×10⁵ to not more than 1×10⁶.

3. The laminate of claim 1, wherein component (I) is 50 to 70 mol % of the copolymer and the weight average molecular is not less than 1×10⁵ to not more than 1×10⁶.

4. The laminate of claim 2, wherein said aromatic polycarbonate has the formula —(O—A₁—O—CO)—, wherein A₁ is a bivalent aromatic residue derived from a bivalent phenol used for the production of the aromatic polycarbonate.

5. The laminate of claim 3, wherein said aromatic polycarbonate has the formula —(O—A₁—O—CO)—, wherein A₁ is a bivalent aromatic residue derived from a bivalent phenol used for the production of the aromatic polycarbonate.

* * * * *